US009851563B2

(12) United States Patent
Gao et al.

(10) Patent No.: US 9,851,563 B2
(45) Date of Patent: Dec. 26, 2017

(54) WIDE-FIELD OF VIEW (FOV) IMAGING DEVICES WITH ACTIVE FOVEATION CAPABILITY

(71) Applicant: Magic Leap, Inc., Plantation, FL (US)

(72) Inventors: Chunyu Gao, Tucson, AZ (US); Hong Hua, Tucson, AZ (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 13/856,847

(22) Filed: Apr. 4, 2013

(65) Prior Publication Data

US 2014/0218468 A1   Aug. 7, 2014

Related U.S. Application Data

(60) Provisional application No. 61/620,581, filed on Apr. 5, 2012, provisional application No. 61/620,574, filed on Apr. 5, 2012.

(51) Int. Cl.

| | |
|---|---|
| *G03B 37/02* | (2006.01) |
| *G02B 27/01* | (2006.01) |
| *H04N 5/225* | (2006.01) |
| *H04N 5/232* | (2006.01) |
| *G02B 13/06* | (2006.01) |
| *G02B 27/10* | (2006.01) |
| *G02B 27/14* | (2006.01) |
| *G02B 27/28* | (2006.01) |
| *G02B 5/04* | (2006.01) |

(Continued)

(52) U.S. Cl.
CPC ........... *G02B 27/0172* (2013.01); *G02B 5/04* (2013.01); *G02B 13/06* (2013.01); *G02B 25/001* (2013.01); *G02B 27/1066* (2013.01); *G02B 27/144* (2013.01); *G02B 27/283* (2013.01); *G03B 37/02* (2013.01); *H04N 5/2258* (2013.01); *H04N 5/23238* (2013.01); *G02B 2027/015* (2013.01); *G02B 2027/0118* (2013.01); *G02B 2027/0145* (2013.01); *G06T 19/006* (2013.01)

(58) Field of Classification Search
CPC .... G02B 27/0172; G03B 37/02; G03B 37/04; H04N 5/2258; H04N 5/23238
USPC ..................................................... 348/36, 39
See application file for complete search history.

(56) References Cited

U.S. PATENT DOCUMENTS 3,909,121 A * 9/1975 de Mesquita Cardoso .... 352/44
4,245,240 A * 1/1981 Tanaka .................. H04N 9/045
348/196

(Continued)

FOREIGN PATENT DOCUMENTS

| EP | 1703310 | 9/2006 |
|---|---|---|
| JP | 57-171314 | 10/1982 |

(Continued)

OTHER PUBLICATIONS

Anonymous "Photoxels, What is . . . Aperture" Mar. 1, 2010 http://web.archive.org/web/20100301114939/http://www.photoxels.com/tutorial_aperture.html.*

(Continued)

*Primary Examiner* — Mohammed Rahaman
*Assistant Examiner* — James Boylan
(74) *Attorney, Agent, or Firm* — David C. Lundmark

(57) ABSTRACT

The present invention comprises a foveated imaging system capable of capturing a wide field of view image and a foveated image, where the foveated image is a controllable region of interest of the wide field of view image.

7 Claims, 6 Drawing Sheets

(51) Int. Cl.
*G02B 25/00* (2006.01)
*G03B 37/04* (2006.01)
*G06T 19/00* (2011.01)

(56) References Cited

U.S. PATENT DOCUMENTS

| | | | |
|---|---|---|---|
| 5,135,183 A | 8/1992 | Whitney | |
| 5,455,603 A * | 10/1995 | Hori et al. | 346/134 |
| 5,517,352 A | 5/1996 | Hill | |
| 5,706,137 A | 1/1998 | Kelly | |
| 5,751,462 A | 5/1998 | Shiraishi et al. | |
| 6,347,744 B1 * | 2/2002 | Metlitsky | G06K 7/10683 |
| | | | 235/462.46 |
| 6,356,392 B1 | 3/2002 | Spitzer | |
| 6,457,834 B1 | 10/2002 | Cotton et al. | |
| 6,593,561 B2 * | 7/2003 | Bacarella | G01J 1/4228 |
| | | | 250/208.1 |
| 7,006,123 B2 * | 2/2006 | Yoshikawa | H04N 5/2253 |
| | | | 348/335 |
| 7,023,628 B1 * | 4/2006 | Ning | G02B 13/06 |
| | | | 359/680 |
| 7,542,090 B1 * | 6/2009 | Merchant | G02B 27/58 |
| | | | 348/335 |
| 7,639,208 B1 | 12/2009 | Ha et al. | |
| 7,839,575 B2 | 11/2010 | Dejong et al. | |
| 7,940,299 B2 | 5/2011 | Geng | |
| 7,952,783 B2 | 5/2011 | Holmes et al. | |
| 7,973,834 B2 * | 7/2011 | Yang | G06K 9/3241 |
| | | | 348/240.3 |
| 2001/0000677 A1 | 5/2001 | Takagi | |
| 2002/0113752 A1 | 8/2002 | Sullivan et al. | |
| 2004/0150863 A1 * | 8/2004 | Newman | G02B 26/127 |
| | | | 359/220.1 |
| 2004/0201769 A1 * | 10/2004 | Yoshikawa et al. | 348/335 |
| 2005/0007673 A1 | 1/2005 | Chaoulov et al. | |
| 2005/0083431 A1 * | 4/2005 | Tsutsumi | H04N 5/2254 |
| | | | 348/360 |
| 2005/0211872 A1 * | 9/2005 | Kawano et al. | 250/201.3 |
| 2006/0023105 A1 * | 2/2006 | Kostrzewski | G06T 3/0018 |
| | | | 348/335 |
| 2006/0055811 A1 * | 3/2006 | Frtiz | G02B 26/06 |
| | | | 348/340 |
| 2007/0002131 A1 * | 1/2007 | Ritchey | 348/39 |
| 2007/0110335 A1 * | 5/2007 | Taylor | G06T 11/60 |
| | | | 382/284 |
| 2007/0182812 A1 * | 8/2007 | Ritchey | H04N 5/2254 |
| | | | 348/36 |
| 2008/0097347 A1 | 4/2008 | Arvanaghi | |
| 2008/0111881 A1 | 5/2008 | Gibbs et al. | |
| 2009/0080695 A1 | 3/2009 | Yang | |
| 2009/0185283 A1 * | 7/2009 | Maetaki | G02B 15/177 |
| | | | 359/689 |
| 2010/0045773 A1 * | 2/2010 | Ritchey | 348/36 |
| 2010/0202048 A1 * | 8/2010 | Amitai | G02B 27/0101 |
| | | | 359/485.02 |
| 2011/0181689 A1 * | 7/2011 | Kweon | 348/37 |
| 2011/0213664 A1 | 9/2011 | Osterhout et al. | |
| 2011/0221767 A1 * | 9/2011 | Kostrzewski | G02B 5/09 |
| | | | 345/629 |
| 2012/0068913 A1 | 3/2012 | Bar-Zeev et al. | |
| 2013/0016178 A1 * | 1/2013 | Birkbeck | H04N 5/2254 |
| | | | 348/36 |
| 2013/0088567 A1 * | 4/2013 | Fitzpatrick | G03B 15/006 |
| | | | 348/37 |

FOREIGN PATENT DOCUMENTS

| | | |
|---|---|---|
| JP | 2004-153605 A | 5/2004 |
| JP | 2004-191593 A | 7/2004 |
| JP | 2009-122379 A | 6/2009 |
| JP | 2009-128527 A | 6/2009 |
| WO | 2005/106543 A1 | 11/2005 |
| WO | 2010/053979 A2 | 5/2010 |
| WO | 2012/037290 A2 | 3/2012 |

OTHER PUBLICATIONS

Hua et al. "Dual-sensor foveated imaging system" College of Optical Sciences, University of Arizona, Jan. 14, 2008.*

"International Search Report and Written Opinion dated Jan. 15, 2014", International PCT Patent Application No. PCT/2013/035486 with International Filing Date of Apr. 5, 2013, (5 pages).

"International Search Report dated Jul. 11, 2013", International PCT Patent Application No. PCT/US13/35293 with International Filing Date of Apr. 5, 2012.

Extended European Search Report dated Jan. 11, 2016, European Patent Application No. 13772991.9 in the name of Magic Leap, Inc., (6 pages).

Extended European Search Report dated May 31, 2016, European Patent Application No. 13817261.4 in the name of Magic Leap, Inc., (12 pages).

Armitage, D. et al., "Near-to-eye Systems (Chapter11)", Introduction to Microdisplays, John Wiley & Sons, Jan. 1, 2006, (pp. 337-363).

Kiyokawa, K. et al., "An occlusion-capable optical see-through head mount display for supporting co-located collaboration", Proceedings/The Second IEEE and ACM International Symposium on mixed and Augmented Reality:Oct. 7-10, 2003, Tokyo Japan, IEEE Computer Society, Los Alamitos, California, Oct. 7, 2003, (pp. 133-141.

Kiyokawa, K. et al., "An optical see-through display for mutual occulusion of real and virtual environments", Augmented Realtiy, 2000 (ISAR2000). Proceedings. IEEE and ACM International Symposium on Munich, Germany, Oct. 5-6, 2000, Piscataway, NL, USA, IEEE, US, Oct. 5, 2000, (pp. 60-67).

First Office Action dated Nov. 23, 2016, Chinese Patent Application No. 201380029492.0 (with English Translation), (23 pages).

First Office Action dated Mar. 21, 2017, Japanese Patent Application No. 2015-504728 with English Translation, (9 pages).

* cited by examiner

WIDE-FIELD OF VIEW (FOV) IMAGING DEVICES WITH ACTIVE FOVEATION CAPABILITY

RELATED APPLICATIONS

This application claims priority to U.S. Provisional Application No. 61/620,581, filed on Apr. 5, 2012, and U.S. Provisional Application No. 61/620,574, filed on Apr. 5, 2012, the disclosures of which are incorporated herein by reference in its entirety.

FIELD OF THE INVENTION

The present invention relates generally to wide-Field of View (FOV) imaging devices, and more particularly, but not exclusively, to dual resolution wide FOV imaging system which is capable of simultaneously capturing a large FOV and a small FOV inside the said large FOV with much higher resolution.

BACKGROUND OF THE INVENTION

Real-time acquisition of high-resolution, wide field of view (FOV) and high dynamic range (HDR) images is essential for many military and civilian surveillance applications. For instance, there is an urgent need for an omni-directional imaging system in many surveillance applications where the system, with sufficient resolution and frame rate, can monitor the activities in all directions simultaneously across a very large operating field (e.g. spherical or complimentary hemispherical coverage) while being able to rapidly zoom into one or multiple objects of interest for reliable identification and characterization of the objects. Such a sensor needs to provide both excellent situational awareness and adequate detail resolvability. This type of sensors, if available, can find myriads of applications in both military and commercial markets.

However, when designing an optical imaging system, finite sensor resolution and data bandwidth impose limits on the spatial resolution and FOV achievable in state-of-the-art imaging systems. There is a well-known inherent tradeoff between the FOV and the resolving power for most conventional imaging techniques with a fixed number of pixels: the wider the FOV, the lower the resolving power. Using the traditional cluster-based omnidirectional cameras as an example, in order to achieve a 1 arc minute (~300 micro-rad) angular resolution, it requires at least 50 small FOV cameras (e.g. FOV: 33°×25°) with a 5-Mega pixel sensor on each to cover a spherical field of 360°×360°, which results in a minimum of 250 Mega pixels to be captured, stored and transmitted for a single spherical panoramic image, barring any pixel loss and FOV overlap. To achieve an angular resolution of 2 arc seconds requires a prohibitive number of cameras in the order of thousands to cover a spherical field. As a result, the cost and size of a camera-cluster-based system will be unacceptable for many surveillance applications, not mentioning that clustering over thousands of high-resolution cameras imposes great challenges to the state-of-the-art data management and image processing technologies.

Foveation techniques can actively track and capture a region of interest with high resolution sensor without losing the imaging capability of the peripheral area, similar to the foveation properties of the human vision system. Various imaging systems have been developed to explore the potential of applying the foveation technique in imaging applications. For example, Sandini et al. developed a retina-like CMOS sensor with spatially-variant resolution to mimic the human retina (G. Sandini, P. Questa, D. Scheffer and A. Mannucci, "A Retina-like CMOS sensor and its applications," Proceedings of IEEE Workshop on Sensor Array and Multichannel Signal Process. (2000), pp. 514-9). Martinez and Wick proposed to use a liquid crystal spatial light modulator to dynamically correct the aberrations at the foveated region inside a wide FOV of imaging system (T. Martinez, D. V. Wick and S. R. Restaino, "Foveated, wide field-of-view imaging system using a liquid crystal spatial light modulator," Opt. Express 8, 555-60 (2001); D. V. Wick, T. Martinez, S. R. Restaino and B. R. Stone, "Foveated imaging demonstration," Opt. Express 10, 60-5 (2002)). The aforementioned approaches use only single-sensor to capture both the peripheral region and the foveated region which limits the overall information throughput of the system. Alternatively, Hua and Liu proposed a dual-sensor approach to the foveation imaging technology where two separate sensors are used to capture the peripheral region and the foveated region (Hong Hua and Sheng Liu, "Dual-Sensor foveated imaging system," APPLIED OPTICS, Vol. 47, No. 3, 317-327, 2008). Comparing with the single sensor approach, the dual sensor approach uses two different sensors which can be in different size and different resolution, which has potential to yield high information throughput with low-cost detectors. The main dis-advantage of the dual-sensor approach is that the system employs an a focal system structure which usually has a limited ability to achieve large peripheral FOV and often results in a bulky system.

SUMMARY OF THE INVENTION

The present invention concerns a dual-sensor wide-FOV foveated imaging technique which is capable of acquiring wide-FOV videos of a surrounding space in real time and simultaneously obtaining very high resolution, high-magnification foveated images of multiple targets at high frame rate. The wide-FOV video, with appropriate resolution and frame rate, enables the real-time capability of simultaneously observing a surrounding space for acquiring, detecting, and tracking imminent threats posed by objects, while the high resolution foveated videos are focused on multiple small portions of the wide FOV in real time with substantially higher resolution to enable crucial target recognition and characterization. The region of interest (RoI) of the foveated view can be steered in real time to any part of the wide FOV image. These capabilities are analogous to the searching, tracking, and foveation functions of the human visual system. By integrating the foveation capability into a wide-FOV imaging system, the present invention is able to capture a wide viewing field up to 360°×360° with high angular resolution.

The present invention typically contains two subsystems: the wide-FOV imaging subsystem and the foveated imaging subsystem; and two subsystems are integrated as one system, where two imaging subsystems share the same objective lens, which may result in a compact and lightweight system design. The stop in the foveated imaging subsystem is optically conjugate with the stop in the wide-FOV imaging subsystem through the beamsplitter. For the present invention, the wide-FOV imaging subsystem captures a wide view field while the foveated imaging subsystem captures one or a few selected portions of the said wide view field and yields very high resolution videos to enable accurate target recognition. Compared with state-of-the-art surveillance systems, the present invention has the advantages of being relatively low-cost, compact, low power consumption, low data bandwidth demand as well as uncompromised high performance in terms of FOV, resolution, and real-time acquisition.

The objective lens of the present invention may utilize the rotationally symmetric refractive optical elements to capture an umbrella-like FOV or utilize a curved mirror along with necessary rotationally symmetric refractive optical elements to capture a ring-like panoramic FOV. The scanning mirror of the present invention may be a dual-axis scanning mirror to sample the wide-FOV using two tilting motions or may be a single-axis scanning mirror to sample the wide-FOV using a combined motion of tilting and rotation.

In one aspect of the present invention, the exemplary system may integrate multiple wide-FOV foveated imaging units to achieve a FOV much larger than that of a single unit. The integrated system may or may not possess single viewpoint properties. When a single viewpoint property is desired, a multi-faceted mirror may be used to virtually co-locate the viewpoints of all the imaging units in the integrated system to a single viewpoint.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 1:
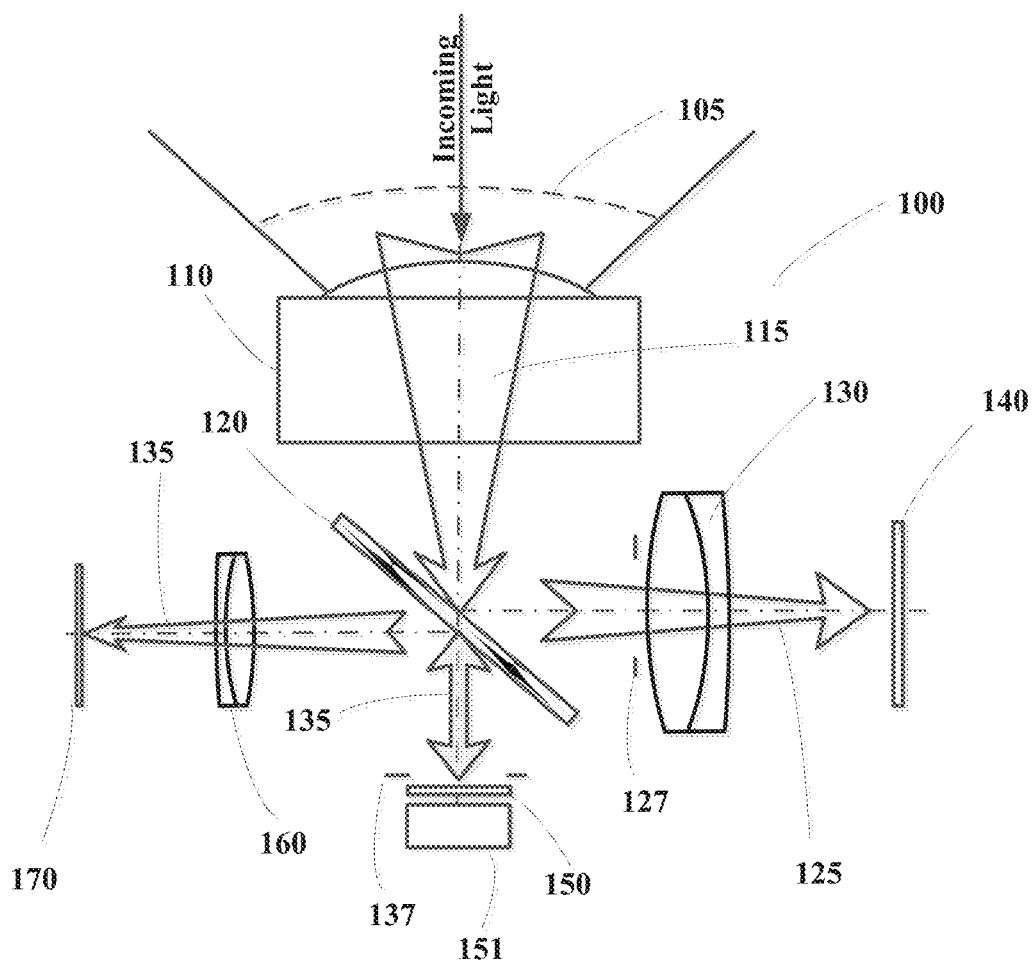
FIG. 1 schematically illustrates an exemplary optical system in accordance with the present invention.

The embodiments according to the present invention will be fully described with respect to the attached drawings. The descriptions are set forth in order to provide an understanding of the invention. However, it will be apparent that the invention can be practiced without these details. Furthermore, the present invention may be implemented in various forms. However, the embodiments of the present invention described below shall not be constructed as limited to the embodiments set forth herein. Rather, these embodiments, drawings and examples are illustrative and are meant to avoid obscuring the invention.

A primary embodiment of the present invention comprises, a foveated imaging system (100), capable of capturing a wide field of view image and a foveated image, where the foveated image is a controllable region of interest of the wide field of view image, the system comprising:

a. an objective lens (110), facing an external scene, configured to receive the incoming light from the external scene and to focus the light upon a beamsplitter;
b. a beamsplitter (120), configured to split incoming light from an external scene into a wide field of view imaging path (125) and a foveated imaging path (135);
c. a wide field of view imaging path (125), the wide field of view imaging path comprising:
   i. a first stop (127), which limits the amount of light received in the wide field of view path from the beamsplitter (120);
   ii. a wide field-of-view imaging lens (130), configured to receive light from the stop (127) and form a wide field view image on a wide field of view imaging sensor;
   iii. a wide field-of-view imaging sensor (140), configured to receive light from the wide field of view imaging lens (130);
d. a foveated view Imaging path (135), the foveated view imaging path comprising:
   i. a second stop (137), which limits the amount of light received in the foveated imaging path from the beamsplitter (120);
   ii. a scanning mirror (150), capable of being controlled to reflect the light from the beamsplitter (120);
   iii. a foveated imaging lens (160), configured to receive a portion of the light, associated with a region of interest of the external scene, from the scanning mirror (150) and form a foveated image on a foveated imaging sensor; and
   iv. a foveated imaging sensor (170), configured to receive light from the foveated imaging lens (160);

In some embodiments, the incoming light from the external scene passes through the objective lens (110) to the beamsplitter (120), where the beamsplitter (120) divides the light into the two optical paths, a wide field of view imaging path (125) and a foveated imaging path (135). In the wide field of view path, the light passes through the first stop (127) to the wide field of view imaging lens (130) along the wide field of view imaging path (125). The lens focuses the wide field of view image upon the wide field of view imaging sensor (140). On the foveated view imaging path, the light passes through the second stop (137) to the scanning mirror (150) along the foveated imaging path (135), where the scanning mirror (150) reflects a region of interest toward the foveated imaging lens (160) through the beam splitter (120), The foveated imaging lens (160) focuses the foveated image upon the foveated imaging sensor (170).

In some embodiments, the objective lens (110) is disposed on the front of the system. The beamsplitter (120) is disposed adjacent to objective lens receiving light from the objective lens. The beamsplitter (120) divides the light into the two optical paths, a wide field of view imaging path (125) and a foveated imaging path (135). The first stop (127) is in optical communication with the beamsplitter (120) along the wide field of view imaging path (125) and the second stop (137) is in optical communication with the beamsplitter (120) along the foveated imaging path (135). The scanning mirror (150) is disposed near or at the position of the second stop (137), where it receives light from the beamsplitter (120) along the foveated imaging path (135) and reflects the light back to the beamsplitter (120). The wide-field of view imaging lens (130) is disposed to face the first stop (127) along the wide field of view imaging path (125), where it receives light from the beamsplitter (120) through the first stop (127) along the wide field of view path (125). The foveated imaging lens (160) is disposed to face the beamsplitter (120), where it receives light from the beamsplitter (120) reflected from the scanning mirror (150) along the foveated imaging path (135). The wide-field of view imaging sensor (140) is disposed to face the wide field of view imaging lens (130). The foveated imaging sensor (170) is disposed to face the foveated imaging lens (160). The two images are recorded by the sensors, a wide field of view image and a high resolution image of the region of interest within it.

In some embodiments, the objective lens (110) is located on the front of the system. The beam splitter (120) is located between the objective lens and the stop (137) facing the objective lens (110) and the scanning mirror (150) so that it receives light from the objective lens. The scanning mirror (150) is located behind the beam splitter, where it receives light from the foveated image path of the beamsplitter (120) and reflects it back to the beamsplitter (120). The wide-field of view imaging lens (130) faces the wide field of view image path of the beam splitter, while the foveated imaging lens (160) faces the foveated image optical path of the beam splitter (120). The wide-field of view imaging sensor (140) faces the wide-field-of-view imaging lens (130), and the foveated imaging sensor (170) is faces the foveated imaging lens (160).

In some embodiments, the incoming light from the external scene passes through the objective lens (110) to the beamsplitter; whereupon the beam splitter (120) transmits one copy of the light to the wide field of view lens (130) and a second copy of the light to the scanning mirror (150). The scanning mirror (150) reflects a region of interest back to the beam splitter (120), and the beam splitter reflects the light to the foveated imaging lens (160). Meanwhile, the wide field of view imaging lens (130) transmits the light in the wide field of view imaging path (125) to the wide field of view image sensor (140). The foveated imaging lens (160) transmits the light in the foveated imaging path (135) to the foveated imaging sensor (170). Thus the two images are recorded by the sensors, a wide field of view image and a high resolution image of the region of interest within it.

FIG. 1 illustrates an exemplary system layout 100 in accordance with the present invention for a dual-sensor wide-FOV foveated imaging system. The system contains two subsystems: the wide-FOV imaging subsystem and the foveated imaging subsystem. The wide-FOV imaging subsystem contains an objective lens 110, a beamsplitter 120, a stop 127, a wide-FOV imaging lens 130, and an imaging sensor 140. The foveated imaging subsystem contains an objective lens 110, a beamsplitter 120, a scanning mirror 150, a stop 137, a foveated imaging lens 160, and an imaging sensor 170. In this exemplary layout 100, the two imaging subsystems share the same objective lens 110, as well as the optical path 115. The light within the FOV 105 is captured by the objective lens 110. After the light passes through the objective lens 110, the optical path 115 is split into two different paths by the beamsplitter 120: the wide-FOV imaging path 125 and the foveated imaging path 135. In the wide-FOV imaging path 125, the wide-FOV imaging lens 130 images the entire visual field within the FOV 105 captured by the objective lens 110 on wide FOV imaging sensor 140. In the foveated imaging path 135, the scanning mirror 150 placed at or near the position of the stop 137 and reflects some rays within the FOV 105 captured by the objective lens 110. By tilting the scanning mirror 150 instantaneously towards the direction of interest, rays from the interested sub-FOV of the FOV 105 are redirected to the beamsplitter 120 and reflected toward the foveated imaging lens 160 and imaged on the foveated imaging sensor 170.

In this exemplary layout 100, the objective lens 110 may be a group of rotationally symmetric lenses to capture a continuous umbrella-like FOV, or near-hemispherical-shape FOV, or near-spherical-shape FOV, The objective lens 110 could also contain a curved mirror surface along with necessary rotational symmetric lenses to capture a ring-like panoramic FOV. The curved mirror could be a spherical mirror, a parabolic mirror, a hyperbolic mirror, a conical mirror, an elliptical mirror, or aspherical mirror with or without symmetry or alike. The imaging sensors 140 and 170 can be any light sensing device containing an array of light sensing units (pixels) that converts photons into electronic signals, including, but not limited to, a charge-couple device (COD), or a complementary metal-oxide-semiconductor (CMOS) or other type of light sensing devices. The scanning mirror 150 can be any type of fast moving mirror devices whose scanning motion can be electronically controlled, including, but not limited to, voice coil mirror, piezoelectric mirror, Micro-Electro-Mechanical System (MEMS) mirror or other type of scanning mirrors. The beamsplitter 120 could be in form of a cube or a plate and could be a non-polarized beamsplitter or a polarized beamsplitter. When a polarized beamsplitter is used, a quarter-wave plate may be used along with the beamsplitter to increase the light efficiency. The quarter-wave plate may be positioned in the space between the beamsplitter 120 and the stop 137. Additional polarizers may be used in both the foveated imaging path 135 and the wide-FOV imaging path 125 to reduce the crosstalk between two paths.

As one of its benefits, the present invention combines two imaging subsystems into one integrated system, where two imaging subsystem share the same objective lens, which may result in a compact and lightweight system. The stop 137 in the foveated imaging subsystem is optically conjugate with the stop 127 in the wide-FOV imaging subsystem through the beamsplitter 120. For the present invention, the wide-FOV imaging subsystem captures a wide view field while the foveated imaging subsystem captures one or a few selected portions of the said wide view field and yields very high resolution videos to enable accurate target recognition. Compared with state-of-the-art surveillance systems, the present invention has the advantages of being relatively low-cost, compact, low power consumption, low data bandwidth demand as well as uncompromised high performance in terms of FOV, resolution, and real-time acquisition.

Figure 2A:
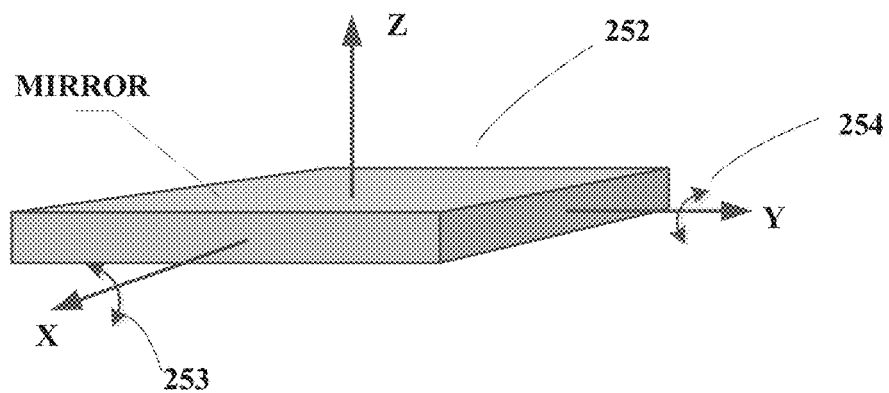
FIGS. 2a and 2b schematically illustrate two types of motions of the scanning mirror used in accordance with the present invention.
Figure 2B:
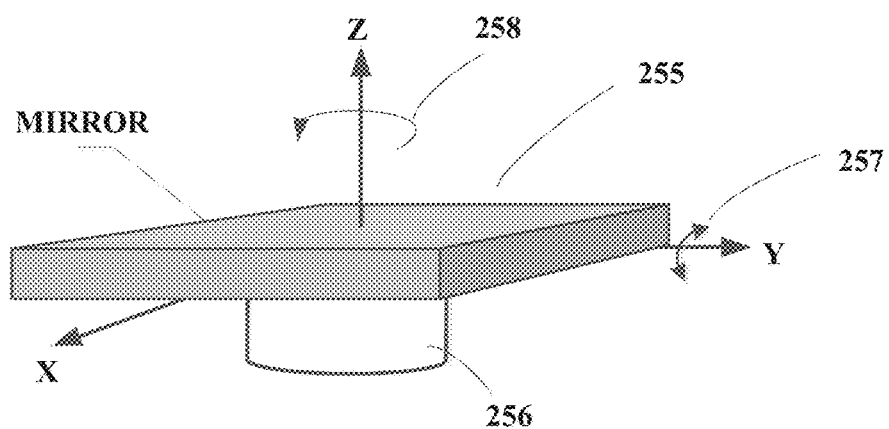

In one aspect of the present invention, the scanning mirror may be a dual axis scanning unit 252 for continuously sampling the wide-FOV through tilting motions 253 and 254 along X and Y axes as illustrated in FIG. 2a. The scanning mirror may also be a single axis scanning unit 255 mounted on a rotational stage 256 or with ability of rotating along the Z axis as show in FIG. 2b, in which the mirror samples the wide-FOV through a tilt motion 257 along the Y axis and a rotation motion 258 along the Z axis.

Compared to the dual sensor approach in the prior arts, the present invention uses a regular imaging system structure where the optical stop is inside the imaging system with a group of lenses are in front of the stop and a group of lenses are behind the stop. The advantages of using the regular imaging system structure over the afocal system in the prior art are:

a. Allowing a more compact system and easier to design given that certain optical aberrations may be corrected by using lenses at both side of the stop;

b. Capable of achieving a much bigger FOV than that of an afocal system while maintaining a compact form factor.

In another significant aspect, the present invention uses a pair of optical conjugated stops which are inside the imaging system and created through a beamsplitter and located in the wide field of view and foveated view optical paths, respectively. In the prior art, the stop is placed at the entrance to an afocal system, and the image of the stop created through the afocal system is on the other side of the afocal system.

The yet another significant aspect, in the prior art, the scanning mirror is controllable only through X and Y tilt axes. In the present invention the scanning mirror may also be configured to use an X or Y tilt and Z rotation instead.

Figure 3:
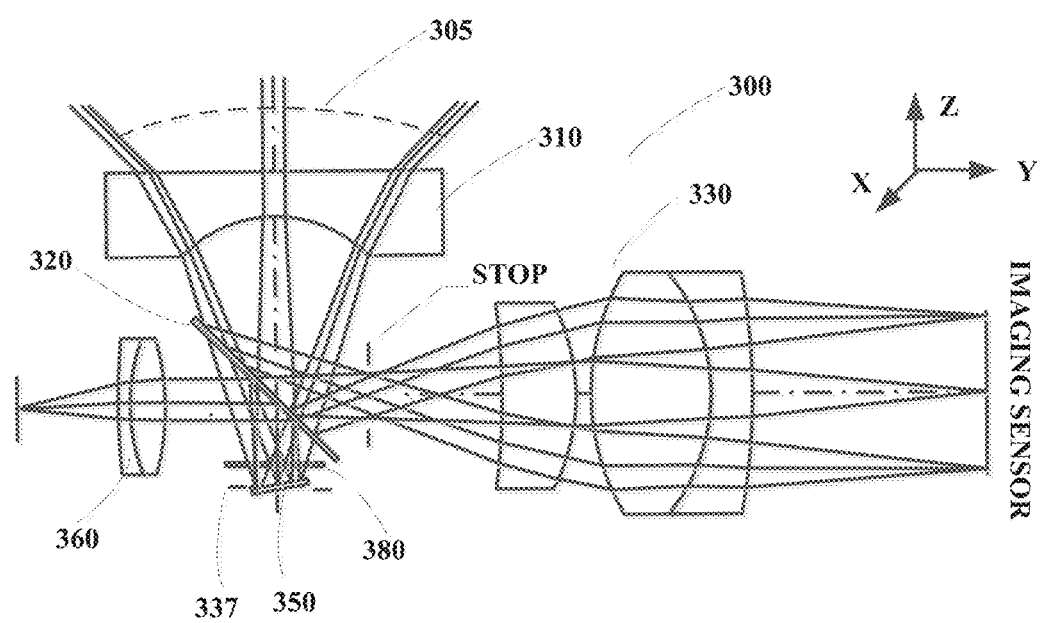
FIG. 3 schematically illustrates an exemplary design of the aforementioned optical system in accordance with the present invention.

FIG. 3 schematically illustrates an exemplary design 300 of the present invention utilizing only the rotationally symmetric lens to capture an umbrella-like FOV 305. In this exemplary design 300, the objective lens 310 contains only a planar-concave lens element. A three-element lens is used as the wide-FOV imaging lens 330. A dual-axis high-speed scanning mirror 350, which scans in both X and Y directions, is placed near the stop 337 for sampling a Region of Interest (ROI) in the FOV 305. The beamsplitter 320 is a wire-grid type polarized beamsplitter. A quarter-wave plate 380 is placed between the beamsplitter 320 and the scanning mirror 350 to change the polarization of the light after passing through the wave plate two times. In one of exemplary implementations, the foveated imaging lens 360 may use a cemented doublet. To further improve the system optical performance, more lens elements may be added in both the foveated imaging path and the wide-FOV imaging path before or after the stops.

Figure 4:
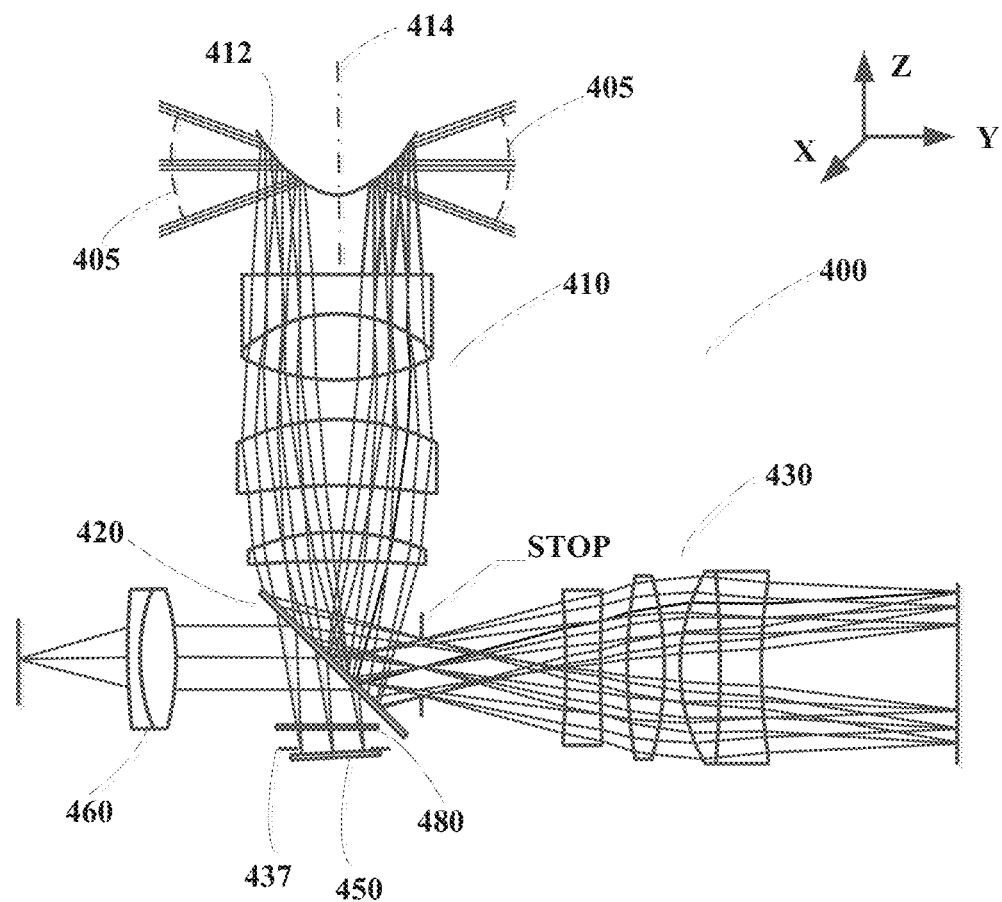
FIG. 4 schematically illustrates another exemplary design of the aforementioned optical system in accordance with the present invention containing a curved mirror surface.

FIG. 4 schematically illustrates an exemplary design 400 of the present invention utilizing a curved mirror to capture a ring-like panoramic FOV 405. In this exemplary design 400, the objective lens 410 contains 5 optical elements. The first element in the objective lens 410 is a curved mirror 412. The optical surface of the curved mirror 412 is a rotational symmetric mirror surface whose surface profile may be described by a 1-dimensional polynomial swept 360 degree along its rotational axis 414. A four-element lens is used as the wide-FOV imaging lens 430. A single-axis high-speed scanning mirror 450 is mounted on a rotation stage and is placed near the stop 437 to scan the panoramic FOV 405 through a tilting motion and a rotating motion as described in connect to FIG. 2b. The beamsplitter 420 may utilize a polarized beamsplitter. A quarter-wave plate 480 is placed between the beamsplitter 420 and the scanning mirror 450 to change the polarization of the light after passing through the wave plate two times. In one of exemplary implementation, the foveated imaging lens 460 may use a cemented doublet. To further improve the system optical performance, more lens elements may be added in both the foveated imaging path and the wide-FOV imaging path before or after the stops.

Figure 5:
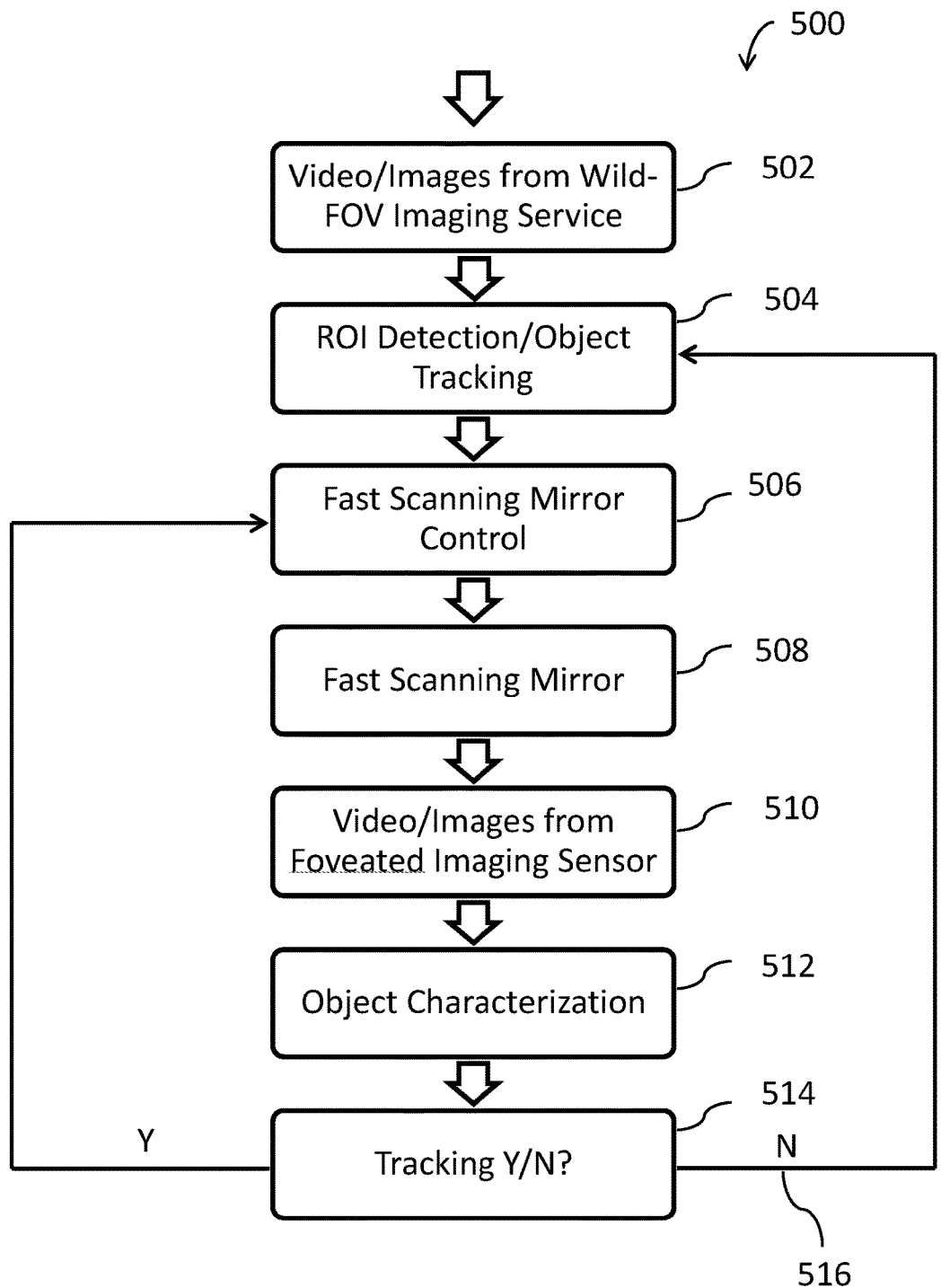
FIG. 5 depicts a block diagram of an example of an image processing pipeline in accordance with the present invention.

FIG. 5 depicts a block diagram of an example of an image processing pipeline 500 necessary for the present invention. Firstly; an event/object detection algorithm is necessary to process the wide-FOV image 502 to find the region(s) of interest (ROI) 504. Once a region of interest is identified; a signal along with the position (angle) information of the ROI is sent to the fast scanning mirror 506/508 to resample the region of interest with the foveated imaging sensor 510. An image analysis algorithm is then applied to the foveated image to collect detail information regarding the ROI 512. The analysis result will determine whether it is necessary to track the region and/or take further actions 514. Sometimes, one or a few images may not be sufficient to characterize an ROI 514, it is then necessary to continue tracking the ROI in the panoramic view, additional to the tracking with the scanning mirror 504.

Figure 6:
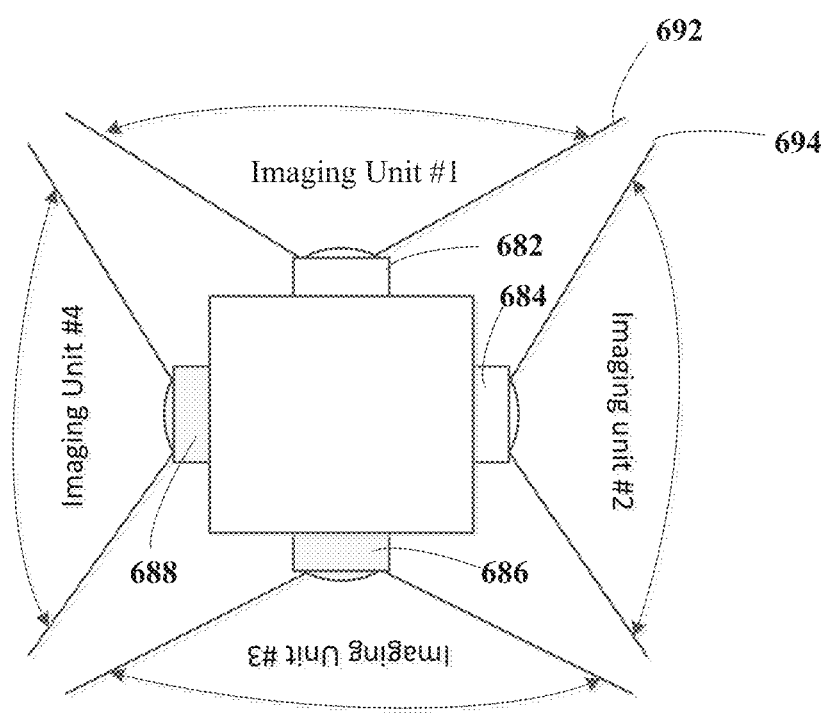
FIG. 6 schematically illustrates a design layout of an exemplary optical system containing multiple imaging units in accordance with the present invention.

FIG. 6 schematically illustrates a design layout 600 of an exemplary optical system containing multiple imaging units for extending system FOV. The exemplary system comprises at least two wide-FOV foveated imaging devices clustered together to capture a designated FOV larger than that of a single unit. In the design layout 600, 4 wide-FOV foveated imaging devices 682, 684, 686, 688 are used to extend the overall FOV to 360 degree. The imaging units are mounted together with their FOV pointing away from each other. To eliminate the blind spot in the overall FOV of the system 600, it is desired that the imaging units are mounted in such a way that there is FOV overlap between any two neighboring units. Using units 682 and 684 as an example, the FOV boundary 692 of the unit 682 must intersect with the FOV boundary 694 of the unit 684 at a certain distance from the imaging units to ensure there is no FOV gap between two units beyond said distance from the imaging units.

In one aspect of the present invention related to FIG. 6, the exemplary system of Hg. 6 does not possess a single viewpoint. A single viewing point means that all the imaging units in the duster effectively capture the entire visual field from a common viewing position, while the imaging units in a multi-viewing-point duster capture the imaging field from displaced viewing positions. For certain applications, it is desired that the entire imaging field must be captured from a single viewing point. To achieve single viewpoint property, a multi-faceted mirror may be used to virtually co-locate the viewpoints of all the imaging units in the cluster system to a single viewpoint.

What is claimed is:

1. A foveated imaging system, capable of capturing a wide field of view image and a foveated image, where the foveated image is a controllable region of interest of the wide field of view image, the system comprising:

a. an objective lens, facing an external scene, configured to receive incoming light from an external scene and to focus the light upon a beamsplitter;

b. a beamsplitter, configured to split the incoming light from the external scene into a wide field of view imaging path and a foveated imaging path;

c. the wide field of view imaging path comprising:

i. a first stop, separate from the objective lens, which limits the amount of light received in the wide field of view path from the beamsplitter;

ii. a wide field of view imaging lens, different from the objective lens and configured to receive light from the first stop and form a wide field view image on a wide field of view imaging sensor;

iii. a wide field of view imaging sensor, configured to receive light from the wide field of view imaging lens;

d. the foveated imaging path consisting of:

i. a second stop, which limits the amount of light received in the foveated imaging path from the beamsplitter;

ii. a scanning mirror, the scanning mirror being a multi-axis movable mirror configured to reflect the light from the beamsplitter;

iii. a reflective surface, disposed upon the beamsplitter, configured to direct light reflected by the scanning mirror;

iv. a foveated imaging lens, configured to receive a portion of the light, associated with a region of interest of the external scene, from the scanning mirror, and form a foveated image on a foveated imaging sensor; and v. a foveated imaging sensor, configured to receive light from the foveated imaging lens, wherein the incoming light from the external scene passes through the objective lens-to the beamsplitter, wherein the beamsplitter divides the light into the two optical paths, the wide field of view imaging path and the foveated imaging path, wherein the light passes through the first stop to the wide field of view imaging lens-along the wide field of view imaging path, wherein the wide field of view imaging lens focuses the wide field of view image upon the wide field of view imaging sensor, wherein the light passes through the second stop to the scanning mirror along the foveated imaging path, wherein the scanning mirror reflects a region of interest toward the foveated imaging lens through the reflective surface on the beam splitter, wherein the foveated imaging lens focuses the foveated image upon the foveated imaging sensor, and wherein the two images are recorded by the wide field of view and foveated sensors, a wide field of view image and a higher resolution image of the region of interest within it.

2. The foveated imaging system according to claim 1, wherein the objective lens is disposed on the front of the system, wherein the beamsplitter is disposed adjacent to objective lens, and receives light from the objective lens, wherein the first stop is in optical communication with the beamsplitter along the wide field of view imaging path, wherein the second stop is in optical communication with the beamsplitter along the foveated imaging path, wherein the scanning mirror is disposed immediately behind the second stop in the foveated imaging path, and receives light from the beamsplitter along the foveated imaging path and reflects the light back to the beamsplitter, wherein the wide-field of view imaging lens is disposed to face the first stop along the wide field of view imaging path, and receives light from the beamsplitter through the first stop-along the wide field of view path, wherein the foveated imaging lens is disposed to face the beamsplitter, and receives light from the beamsplitter reflected from the scanning mirror along the foveated imaging path, wherein the wide-field of view imaging sensor is disposed to face the wide field of view imaging lens, and wherein the foveated imaging sensor is disposed to face the foveated imaging lens.

3. The foveated imaging system according to any one of the preceding claims, where the objective lens is a group of rotationally symmetric lenses to capture a substantially hemispherical shaped field of view.

4. The foveated imaging system according to any one of claims 1-2, where the objective lens utilizes a curved mirror along with necessary rotationally symmetric refractive optical elements to capture a substantially ring shaped field of view.

5. The foveated imaging system according to any one of claims 1-2, where the foveated imaging lens contains aspherical reflective or refractive surfaces.

6. The foveated imaging system according to any one of claims 1-2, where the wide field of view imaging lens is a group of rotationally symmetric lenses that magnify the wide field of view image.

7. The foveated imaging system according to any one of claims 1-2, where the wide field of view imaging lens contains aspherical reflective or refractive surfaces.

* * * * *